United States Patent

[11] 3,607,360

| [72] | Inventor | Otto C. Elmer |
| | | 720 Hillsdale Ave., Akron, Ohio 44303 |
| [21] | Appl. No. | 813,318 |
| [22] | Filed | Apr. 3, 1969 |
| [45] | Patented | Sept. 21, 1971 |

[54] METHOD OF IMPROVING ADHESION OF LOW FRICTION COATING TO ELASTOMERS
5 Claims, No Drawings

[52] U.S. Cl. .................................................. 117/72,
117/76 F, 117/138.8 E, 117/138.8 UA, 117/161
KP, 117/161 H, 260/858
[51] Int. Cl. ....................................................... B44d 1/14,
B32b 27/08
[50] Field of Search .......................................... 117/72, 76
F, 76 T, 161 H, 161 KP, 138.8 UA, 138.8 E, 139,
47 A

[56] References Cited
UNITED STATES PATENTS

| 3,169,936 | 2/1965 | Armour et al. | 117/139 X |
| 3,354,107 | 11/1967 | Hamed | 117/139 X |
| 3,495,394 | 2/1970 | Mohajer | 117/161 KP |
| 3,511,685 | 5/1970 | Rentschler | 117/139 X |

*Primary Examiner*—William D. Martin
*Assistant Examiner*—Ralph Husack
*Attorneys*—Frank C. Rote, Jr., John J. Murphey and Denbigh S. Matthews

ABSTRACT: This invention concerns methods of improving the adhesion between low-friction coatings and elastomeric surfaces by the steps of precoating an EPDM elastomeric surface with a chlorinated ethylene-propylene copolymer containing from about 15 percent to about 25 percent chlorine and, applying a polyurethane low-friction coating to said precoated elastomeric surface. The copolymer may also be used as an additive to the low-friction coating mixture instead of as a precoat.

3,607,360

METHOD OF IMPROVING ADHESION OF LOW FRICTION COATING TO ELASTOMERS

BACKGROUND OF THE INVENTION

1. Field of the Invention

This invention relates to the field of low-friction coatings for elastomers. More particularly, this invention relates to low-friction coatings for nonpolar elastomers and to methods of improving the adhesion therebetween.

2. Description of the Prior Art

Many relatively soft, rubbery surfaces exhibit high friction when moved under pressure against a metal or other hard surface. This characteristic is used to advantage in certain elastomeric products such as in rubber tires, shoe soles, and pencil erasers, however, in other products high friction is a disadvantage.

For instance, in the trunk of an automobile, where some portions of the curved trunk lid slide into contact with the trunk, the high friction characteristic of the elastomeric gasket surrounding the trunk causes the gasket to seize against the lid, and possibly fold or tear, when the lid is opened and closed. In these situations, i.e., where the high friction characteristic of the elastomer is a disadvantage, the art has used low-friction coatings on the elastomeric surface.

A low-friction coating, as the name indicates, is a coating placed on an elastomer that imparts a slick or low-friction finish to the surface thereof. Because of other environmental conditions, such as dust, vibration, and varying temperatures, low-friction coatings usually are required to possess additional properties such as abrasion resistance, low temperature flexibility, and good adhesion.

A popular low-friction coating is polyurethane resin. It is usually prepared by grinding (ball milling) a mixture of a reaction product of a polyol and an isocyanate with carbon blacks, silica fillers and dispersants to form a smooth paste and then diluting the paste with solvent. This liquid is then applied to the surface of the elastomer and the reaction product cross-linked with water to form the polyurethane coating.

Low-friction urethane coatings may be placed on elastomeric surfaces in various ways. For example, an ASTM (American Society for Testing and Materials) type 1 urethane coating comprises a one-package, oil-modified urethane based upon the reaction of a diisocyanate with the alcoholysis product of a drying oil and a polyhydroxyl material. The liquid is applied to the elastomeric surface and slowly air cured at room temperature. An ASTM type 2 urethane coating is a one-package, moisture-cured urethane comprising a polyol-diisocyanate adduct, containing free isocyanato groups, that is applied to the elastomeric surface and cured through the reaction of the free isocyanato groups with atmospheric moisture. An ASTM type 3 urethane coating is a blocked adduct type urethane comprising a mixture of a polyol and an isocyanate adduct that is blocked to make it nonreactive to the polyol at room temperature. After the coating is applied, the isocyanate is unblocked by heating, leaving the isocyanato groups free to react with the available hydroxyl groups of the polyol. An ASTM type 4 urethane coating is a two-package catalyzed urethane comprising an isocyanato terminated prepolymer and a separate catalyst. The two components are mixed, applied to the elastomeric surface, and cured at high temperatures. An ASTM type 5 urethane coating is a two-package polyol urethane comprising an isocyanate adduct, or prepolymer, containing terminal isocyanato groups and a separate polyhydroxyl material. The two components are mixed, applied to the elastomeric surface, and cured at room temperature.

There has been considerably difficulty encountered in achieving good adhesion between low-friction coatings and various elastomers. Most cured elastomers are relatively nonpolar, that is, they contain relatively few polar groups such as hydroxyl groups, carbonyl groups, ester groups, and ether groups. In contrast, low-friction coatings such as polyurethane resins are highly polar due to the repeating urethane groups, polyester groups, and polyether chains. This difference in polarity causes the low-friction coating and the elastomeric surface to be incompatible and prevents good adhesion therebetween.

There are methods known in the art for improving the adhesion between low-friction coatings and relatively nonpolar elastomers. These methods involve polarizing the surface of the elastomer and include treatment with mineral acids (U.S. Pat. No. 3,080,255), oxidizing agents, and alkalis.

Recently, EPDM rubber technology has advanced to where EPDM is seriously being considered as a prime gasket material. EPDM is the ASTM designation for a terpolymer of ethylene, propylene, and a nonconjugated diolefin. The ethylene and propylene form a fully saturated backbone of methylene linkages with unsaturated side chains where the nonconjugated diolefin, usually dicyclopentadiene or methylene norbornene, is attached to provide readily available cross-linking sites for sulfur curing. The fully saturated backbone of EPDM elastomers provides outstanding resistance to oxidation, ozone, and cracking and excellent low-temperature flexibility. In addition, the elastomers can be extended with oils and heavily loaded with fillers to reduce their cost.

Unfortunately, the total saturation and absence of polar groups in EPDM elastomers works as a disadvantage in relation to low-friction coatings. Whereas unsaturated (and nonpolar) elastomers can be polarized by treatment with mineral acids, oxidizing agents, and alkalis, relatively saturated EPDM elastomers cannot be so polarized and they remain difficult to successfully coat with low-friction materials.

This invention is the discovery that a chlorinated ethylene-propylene copolymer containing between about 15 percent to about 25 percent chlorine improves the adhesion between low-friction coatings and elastomeric surfaces, especially surfaces of EPDM elastomers, when used either as a prime coat (precoat) or as an additive to the low-friction coating mixture. Therefore, the main object of this invention is a method of improving the adhesion between low-friction coatings and surfaces of elastomers. Other objects include simple and relatively inexpensive methods to improve the adhesion between low-friction coatings and elastomeric surfaces that are amenable to automatic control.

DESCRIPTION OF PREFERRED EMBODIMENTS

In one embodiment of this invention the adhesion-improving material is applied to the elastomeric surface as a precoat. This precoat is then dried and the low-friction coating applied thereover.

Elastomeric products that require low-friction coatings are produced by conventional methods. In the case of EPDM gasket material, these conventional methods include compounding the elastomer with extenders, fillers, accelerators, processing aids, lubricants, etc. and extending or otherwise processing the compound into a gasket whereupon the gasket is conventionally cured.

The surface of the gasket is first cleaned of foreign matter, such as residual mold release agent, processing aids, and dirt, by washing it with a nonreactive solvent such as carbon tetrachloride, trichloroethylene, or perchloroethylene.

The adhesion-improving material of this invention is a chlorinated ethylene-propylene copolymer containing from about 15 percent to about 25 percent chlorine. This material is commercially available. In this embodiment, the material is mixed with a nonreactive solvent, such as toluene, to form a solution or cement. Generally, the concentration is kept low, about 5–15 percent (weight), to maintain the viscosity of the solution within workable limits.

A coat (precoat) of the material is then applied to the surface of the elastomer by conventional means such as by dipping, rolling, painting, or spraying. The solvent is driven off, such as by air-drying, to leave a thin coat of adhesion-improving material on the elastomer.

The low-friction coating is then applied over the precoat by conventional means, usually by dipping the gasket into a container of the liquid coating mixture. The coating is then cured; in the case of an ASTM type 2 urethane low-friction coating the cure consists of heating the coating in an oven containing excess moisture so that the isocyanato groups in the coating react with the water and cross-link the polyisocyanate.

In another embodiment of this invention the adhesion-improving material is added directly to the low-friction coating. In this embodiment the adhesion of the low-friction coating is improved over that occurring without the additive but the improvement is not as much as when the same material is used as a precoat.

In this embodiment the elastomeric surface is cleaned of foreign matter as previously described. The adhesion-improving material is added to the low-friction coating either during preparation (ball milling) of the paste or added as a cement directly to the liquid low-friction coating mixture. The low-friction coating mixture containing the adhesion-improving material is then applied to the surface of the elastomer and cured as described earlier.

The degree of adhesion between the elastomeric surface and the low-friction coating is determined by measuring the amount of force required to pull them apart. In some instances, the coating may plastically deform while it is being pulled from the elastomeric surface and thereby introduce error in the determination. This and other factors indigenous to plastics and elastomers prevent such a determination from providing anything other than a relative degree of adhesion between similar systems. On this basis, the following test was established to determine the relative degree of adhesion between elastomeric surfaces and low-friction coatings applied thereto as enhanced by the teachings of this invention.

An EPDM terpolymer was compounded into a typical gasket formulation except that the blowing agent was omitted to simplify processing. The elastomeric compound was processed and cured into 0.075 inch thick (75 mil) tests strips measuring 2 × 6 inches. These strips were cleaned in hexane solvent, and air-dried. One end of each test strip was then coated with a polytetrafluoroethylene release agent.

When the adhesion-improving material of this invention was tested as a precoat, a test strip was dipped once into a solution of the material, air-dried at room temperature, then dipped twice into the low-friction coating mixture and cured. In the case of the ASTM type 2 urethane coating, the cure was accomplished in an oven (containing room-air moisture) at about 120° C. for about 15 minutes.

When the adhesion-improving material of this invention was tested as an additive to the low-friction coating, a test strip was dipped twice into the low-friction coating mixture containing the material, and cured as described above. In both these tests, the dipping was conducted so that the low-friction coatings overlapped the release agent-coated end of the test strip to later enable a flap of the low-friction coating to be lifted from the end of the test strip and clamped into the force-recording (Instron) machine. In all tests, the test strips were stored at room temperature for at least one week. Thereafter, they were clamped in an Instron machine and the coatings pulled from the elastomeric surfaces. The maximum force experienced during pulling is recorded in units of pounds (force) per one-half inch. In the following examples, all parts are parts per hundred parts elastomer and all percentages are by weight unless otherwise indicated. All footnotes follow Example 2.

Two batches of EPDM rubber were prepared according to formulas A and B shown below in table I, processed, and cured into 75 mil thick test strips measuring 2 inches × 6 inches. These test strips were wiped clean with a hexane-soaked cloth. Hereafter, the test strips will be identified by the letter A or B to denote the formula of the EPDM rubber.

TABLE I

| Ingredients | A | B |
| --- | --- | --- |
| EPDM polymer (Nordel 1070) [1] | 100 | |
| EPDM polymer (Royalene 501/502) [2] | | 100 |
| Tetramethylthiuram monosulfide | 1 | |
| Tellurium diethyldithiocarbamate | 2 | 1 |
| Mercaptobenzothiazole | 1 | |
| Sulfur | 4 | 2 |
| Zinc oxide | 5 | 5 |
| Stearic acid | 1 | 2 |
| Carbon Black (FEF) | 80 | |
| Carbon black (SRF) | | 100 |
| Napthenic oil | 80 | 60 |
| Soft clay | | 50 |
| N,N -diphenyl-thiourea | 3 | 3 |
| Zinc dimethyldithiocarbamate | 3 | 3 |
| Vocol [3] | 1.5 | 1.5 |
| Wax | | 5 |

EXAMPLE 1

Three chlorinated ethylene-propylene copolymers, labeled 1, 2, and 3 and containing 14.5 percent [4] chlorine, 19 percent [5] chlorine, and 26 percent chlorine [6] respectively were separately dissolved in a solvent consisting of a 1:1 (weight) ratio of toluene and perchloroethylene as shown below in table 1. Test strips of EPDM polymers A and B were dipped into these solutions, air-dried at room temperature for 1 hour, then dipped twice into an ASTM type 2 low-friction urethane coating mixture (Chemglaze Z-306) [7] allowing 15 minutes air-drying between each dipping. The test strips were cured at 120° C. for 15 minutes in an oven containing room air moisture and aged for one week at room temperature. Each strip was then placed in an Instron testing machine where the low-friction coating was pulled from the strip. The maximum force measured during the pulling is recorded in table 1 below: (A-296/82-83)

TABLE 1

| Percent chlorine in ethylene-propylene copolymer | Wt. percent strength in solution | EPDM polymer | Max. force of pulling film from strip, lbs./½ inch |
| --- | --- | --- | --- |
| 14.5 | 1 | A | 0.13 |
| 14.5 | 1 | B | ---- |
| 14.5 | 2 | A | 0.30 |
| 14.5 | 2 | B | ---- |
| 14.5 | 5 | A | 0.06 |
| 14.5 | 5 | B | ---- |
| 14.5 | 7 | A | 0.75 |
| 14.5 | 7 | B | ---- |
| 19 | 1 | A | 0.52 |
| 19 | 1 | B | 0.70 |
| 19 | 2 | A | 0.72 |
| 19 | 2 | B | 1.40 |
| 19 | 5 | A | 0.93 |
| 19 | 5 | B | 1.13 |
| 19 | 7 | A | 0.90 |
| 19 | 7 | B | 0.80 |
| 26 | 1 | A | ---- |
| 26 | 1 | B | ---- |
| 26 | 2 | A | ---- |
| 26 | 2 | B | ---- |
| 26 | 5 | A | ---- |
| 26 | 5 | B | ---- |
| 26 | 7 | A | 0.23 |
| 26 | 7 | B | ---- |

This example shows that chlorinated ethylene-propylene copolymers containing from about 15 percent to about 25 percent chlorine perform best in improving adhesion between low-friction coatings and EPDM elastomer surfaces.

EXAMPLE 2

The chlorinated ethylene-propylene copolymer of example 1, containing 19 percent chlorine, was put into solution in xylene at 10 percent weight strength. Portions of the solution were added to an ASTM type 2 low-friction urethane coating mixture (Chemglaze Z-306) as shown below in table 2 and test strips of EPDM elastomer A and B dipped into the mixture as in example 1 and cured at 120° C. for 15 minutes and 120° C. for 1 hour. The relative improvement in coating adhesion is shown in table 2.

TABLE 2

| EPDM polymer | Low-friction coating, g. | 10% solution, 19% Cl copolymer, gm. | Max. force of pulling coating from strip lbs./½ inch | Cure Temp., °C. | Cure Time, min. |
| --- | --- | --- | --- | --- | --- |
| A | 235 |    | 0.20 | 120 | 15 |
| B | 235 |    | 0.06 | 120 | 15 |
| A | 235 | 10 | 0.40 | 120 | 15 |
| B | 235 | 10 | 0.25 | 120 | 15 |
| A | 235 |    | 0.30 | 120 | 60 |
| B | 235 |    | 0.10 | 120 | 60 |
| A | 235 | 10 | 0.70 | 120 | 60 |
| B | 235 | 10 | 0.35 | 120 | 60 |

This example clearly demonstrates the efficiency of a chlorinated ethylene-propylene copolymer containing about 19 percent chlorine and the improvements brought about by the use thereof. Note that EPDM elastomer A has a 0.20 0/½-inch adhered low-friction coating when cured at 120° C. for 15 minutes in the absence of the material of this invention whereas the addition of the chlorinated ethylene-propylene copolymer to the coating mixture raises the maximum pulling force to 0.40 under the same curing conditions. Similar improvements may be noted with EPDM elastomer B (0.06 vrs. 0.25) and both elastomers A and B at higher curing temperatures (A: 0.30 vrs. 0.70, and B; 0.10 vrs. 0.35).

1. Nordel 1070, EPDM polymer, E.I. duPont de Nemours & Co., Inc.

2. Royalene 501/502, EPDM polymer, Uniroyal Chemical Co.

3. Vocol, Proprietary accelerator, Monsanto Chemical Co.

4. Chlorinated polyolefin 210-1, Eastman Chemical Products, Co.

5. Chlorinated Polyolefin 343-1, Eastman Chemical Products, Co.

6. Chlorinated Polyolefin 515-2, Eastman Chemical Products, Co.

7. Chemglaze Z-306, ASTM Type 2 low-friction coating, Hughson Division, Lord Manufacturing Co.

What is claimed is

1. A method of improving the adhesion between a low-friction coating comprising a cured polyurethane and the surface of a terpolymer of ethylene, propylene, and a nonconjugated diolefin comprising the steps of:
    a. precoating said surface with a chlorinated ethylene-propylene copolymer containing from about 15 percent to about 25 percent by weight chlorine;
    b. applying a curable polyurethane low-friction coating to said precoated surface: and,
    c. curing said polyurethane to form a low-friction coating.

2. The method of claim 1 wherein the step of precoating said surface of said terpolymer comprises the steps of:
    a. mixing said chlorinated ethylene-propylene copolymer with a nonreactive solvent to form a solution;
    b. applying a coating of said solution to said surface of said terpolymer; and,
    c. evaporating said solvent from said coating.

3. The method of claim 1 wherein said low-friction coating comprises a moisture-curable polyurethane comprising a polyolisocyanate adduct containing free isocyanato groups.

4. A method of improving the adhesion between a low-friction coating comprising a cured polyurethane and the surface of a terpolymer of ethylene, propylene, and a nonconjugated diolefin comprising the steps of:
    a. forming a first solution of a curable low-friction polyurethane coating material;
    b. adding to said first solution a second solution of a chlorinated ethylene-propylene copolymer containing from about 15 percent to about 25 percent chlorine by eight in a suitable solvent;
    c. coating said surface of said terpolymer with the combined solutions; and,
    d. drying and curing said polyurethane to form a low-friction coating.

5. The method of claim 4 wherein said low-friction coating material comprises a moisture-curable polyurethane comprising a polyoldiisocyanate adduct containing free isocyanato groups.

PO-1050
(5/69)

UNITED STATES PATENT OFFICE
CERTIFICATE OF CORRECTION

Patent No. 3,607,360          Dated   September 21, 1971

Inventor(s)  Otto C. Elmer

It is certified that error appears in the above-identified patent and that said Letters Patent are hereby corrected as shown below:

In the Title, the word "Coating" should read --Coatings--.
Column 1, Line 71, the word "considerably" should read --considerable--.
Column 4, Line 10, the word "Mercaptobenzothiazole" should read --2-Mercaptobenzothiazole--.
Column 4, Line 16, the phrase "N,N-diphenyl-thiourea" should read --N,N'-diphenyl-thiourea--.
Column 5, Line 2, the phrase "0/1/2-inch" should read --#/1/2-inch--.
Column 6, Line 21, the word "polyolisocyanate" should read --polyol-diisocyanate--.
Column 6, Line 31, the word "eight" should read --weight--.

Signed and sealed this 21st day of March 1972.

(SEAL)
Attest:

EDWARD M.FLETCHER,JR.          ROBERT GOTTSCHALK
Attesting Officer              Commissioner of Patents